No. 766,146. PATENTED JULY 26, 1904.
W. M. JEWELL & W. J. McGEE.
METHOD OF PURIFYING WATER.
APPLICATION FILED JAN. 26, 1903.
NO MODEL.
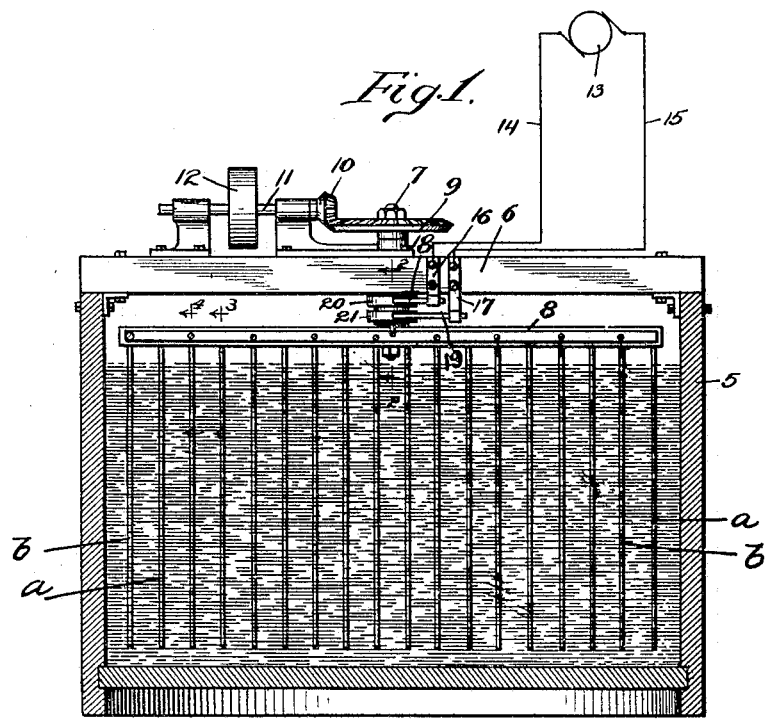
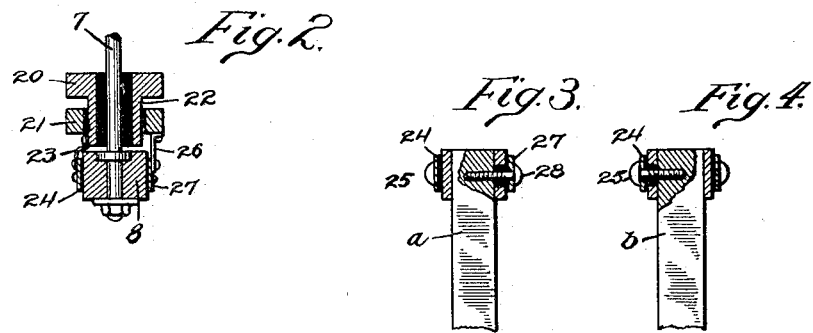
Witnesses:
Edward M. Eisfeldt
Hugh C. Pearson
Inventors.
William M. Jewell,
Willford J. McGee,
by Bond Adams Pickard Jackson,
their Att'ys.

No. 766,146.

Patented July 26, 1904.

UNITED STATES PATENT OFFICE.

WILLIAM M. JEWELL, OF WINNETKA, AND WILLFORD J. McGEE, OF OAK PARK, ILLINOIS, ASSIGNORS TO THEMSELVES, AND OMAR H. JEWELL, OF CHICAGO, ILLINOIS.

METHOD OF PURIFYING WATER.

SPECIFICATION forming part of Letters Patent No. 766,146, dated July 26, 1904.

Application filed January 26, 1903. Serial No. 140,584. (No specimens.)

*To all whom it may concern:*

Be it known that we, WILLIAM M. JEWELL, residing at Winnetka, and WILLFORD J. McGEE, residing at Oak Park, in the county of Cook and State of Illinois, citizens of the United States, have invented a certain new and useful Method of Purifying Water, of which the following is a specification, reference being had to the accompanying drawings.

Our invention relates to the purification of water by removing therefrom mineral salts, which render it unsuitable for domestic or commercial use. For example, a water containing over forty grains of sodium sulfate or ten grains of sodium carbonate is very likely to cause foaming or priming in a boiler, and waters containing soluble salts of calcium are hard and require softening before they are fit for use for many purposes. Many expedients have heretofore been tried for removing objectionable salts; but the results heretofore attained have not been entirely satisfactory for various reasons. One of the principal objections to prior processes has been the soluble character of the reagent which it has been thought necessary to employ to precipitate or convert the objectionable salt, the objection to the use of a soluble reagent residing in the fact that it is impracticable by the use of a soluble reagent to insure against the retention in the water of a greater or less quantity of the reagent after the completion of the process, the result being that the "purified" water instead of being pure differs from the unpurified water only in the character of the impurity contained in it. Moreover, according to some processes heretofore employed to correct the tendency of water to foam the reagent employed being of a poisonous nature renders the water treated unfit for use for drinking purposes.

The object of our invention is to provide an improved process which will not be open to the objections incident to the use of a soluble reagent; and to this end our invention in its broadest aspect consists in employing a substantially water-insoluble reagent and effecting a chemical reaction between the impurities carried in the water and such insoluble reagent to produce insoluble compounds which may be removed by subsidence or filtration or both. The natural salts found in water may be utilized in effecting the reaction where such salts are present in sufficient quantity; but any deficiency may be made up by the introduction of soluble salts capable of reacting with one or more of the elements liberated by the insoluble reagent to form insoluble or innocuous compounds.

More specifically our invention consists in effecting the reaction between the insoluble reagent introduced, as above stated, and the soluble salts of the water by electrolysis.

Our invention further consists in introducing the insoluble reagent into the water in powdered form and effecting its suspension and thorough dissemination throughout the water to be purified by maintaining a circulation or agitation of the water while the electrolytic action is taking place. The reagent which we have found secures the best result is barium carbonate in the form of witherite, which is practically pure anhydrous crystalline carbonate of barium. We wish it to be understood, however, that our invention is not restricted to the use of witherite, as other equivalent substances may be employed. The reaction effected by the introduction of witherite into a water containing sodium sulfate and electrolyzing the solution is as follows: The sodium sulfate is decomposed, the sulfuric radical uniting with the barium to form barium sulfate, which being insoluble is precipitated. The sodium remains as sodium hydrate, carbonic-acid gas being liberated. The formation of sodium hydrate would not result, however, in practice, since if the natural water did not contain sufficient chlorid of calcium or magnesium a quantity of calcium chlorid would be added, so that the liberation of the carbonic-acid gas above described would produce calcium or magnesium carbonate, leaving sodium chlorid in solution, which would not be objectionable for most commercial purposes. In water containing comparatively large amounts of calcium or magnesium sulfates it has heretofore been attempted to precipitate the calcium or magnesium as carbonate, the resultant by-product being sodium sulfate. It frequently happens, however, that such waters also contain a considerable amount of sodium sulfate, which, together with that formed, renders the water so treated liable to foam, and in such instances only a partial softening could be effected. By our process, however, the calcium would be precipitated as carbonate and the barium as sulfate without any increase in the quantity of sodium sulfate. Moreover, the sodium sulfate could be decomposed, the result being that the water would not only be softened, but there would be no liability to foam.

Where the water contains an excessive amount of calcium or magnesium chlorids, in order to prevent the formation of barium chlorid and its appearance in the filtered water a soluble sulfate, such as magnesium sulfate, would be added in sufficient quantity to react with any excess of barium. Where the water contains an excessive amount of sodium sulfate, a soluble chlorid whose carbonate is insoluble in water—such, for example, as calcium chlorid—would be added either to the body of the water under treatment or subsequently to convert the sodium hydrate into chlorid, as hereinbefore described.

As examples of the efficiency of our improved process it may be stated that with a water containing 11.14 grains of calcium sulfate per gallon a current of one ampere for ninety minutes reduced the calcium sulfate to 2.09 grains per gallon, a reduction of 81.23 per cent. In another instance in a water containing 25.95 grains of calcium sulfate per gallon a current of one ampere continued for five hours effected a reduction of the calcium salt to 1.62 grains, a reduction of 93.33 per cent. Corresponding reductions have also been effected with alkaline sulfates. For example, a solution of sodium sulfate containing 193.6 grains per gallon treated with a current of seven amperes for one hundred minutes was reduced to twenty-nine grains per gallon—a reduction of 85.02 per cent.

In practice we prefer to employ an apparatus such as that illustrated in the accompanying drawings; but our invention is not restricted to the use of such apparatus.

In the accompanying drawings, Figure 1 is a vertical section of a tank adapted for use in practicing our improved process, the electric wiring being shown diagrammatically. Fig. 2 is an enlarged detail view, being a section on line 2 2 of Fig. 1, illustrating a part of the mechanism for effecting the proper electrical connections of the electrodes. Fig. 3 is a section on line 3 3 of Fig. 1, and Fig. 4 is a section on line 4 4 of Fig. 1.

Referring to the drawings, 5 indicates a tank over which extends a beam 6, adapted to support parts of the apparatus.

7 indicates a vertical shaft suitably supported by the beam 6 and carrying at its lower end a cross-bar 8, which is adapted to be rotated in the tank over the liquid therein, as shown in Fig. 1. The cross-bar 8 carries a number of depending arms which are also electrodes, being alternately positive and negative, the electrodes of one polarity being marked $a$ and those of opposite polarity being marked $b$. Said poles are preferably made of lead, owing to its being unaffected by sulfuric acid. Said electrodes project down to near the bottom of the tank, so that when the cross-bar 8 is rotated they operate to agitate the liquid in the tank and effect the proper dissemination of the insoluble reagent throughout the body of the liquid. The shaft 7 is rotated to effect the rotation of the cross-bar 8 by means of any suitable mechanism, such as beveled gears 9 10 and shaft 11, upon which the gear 10 is mounted, said shaft being in turn driven by a belt 12.

13 indicates a dynamo or other suitable source of electricity, which is connected by wires 14 15 to poles 16 17, respectively, said poles being in turn connected by brushes 18 19 with disks 20 21, respectively, through which connection is made with the different electrodes. The disks 20 21 are mounted on the shaft 7 and are insulated therefrom and from each other, as shown in Fig. 2, the disk 20 being preferably mounted upon a downwardly-extending sleeve 22, carried by the disk 20. The sleeve 22 is connected by a wire or other suitable connecting device 23 with a metal strip 24, which is secured along one side of the cross-bar 8 and is insulated therefrom, as shown in Figs. 2 and 4. The strip 24 is connected with electrodes $b$ by screws 25, which pass through said strip into said electrodes, as shown in Fig. 4. Similarly the disk 21 is connected by a connection 26 with a strip 27 at the opposite side of the bar 8, said strip 27 being connected by screws 28 with the electrodes $a$. By making the bar 8 of non-conducting material the strips 24 and 27 may be secured directly thereto; otherwise they must be insulated therefrom.

From the foregoing description it will be seen that the cross-bar 8 may be rotated continuously and that whether such cross-bar be rotating or not the electric action will continue as long as the necessary current is supplied. It is immaterial which of the electrodes $a$ or $b$ is the anode and which the cathode, as that depends simply on the direction of the current.

In practice the reagent added is determined by the actual work to be accomplished. An excess of the barium carbonate or commercial witherite in powdered form is placed in the tank and kept in suspension by the rotation of the cross-bar 8. The suspended particles of barium carbonate are therefore adjacent to the electrodes and immediately combine with the sulfuric oxid liberated at the cathodes. By having a large excess of barium carbonate in the tank there is no liability of the ions reuniting. After the desired chemical reaction has been effected the agitator may be stopped and the precipitate allowed to settle in the same tank, or, if desired, the water, with its suspended impurities, may be withdrawn and allowed to subside in a separate receptacle, or it may be filtered. We prefer, however, to remove the precipitate by subsidence in order to facilitate the recovery of the precipitates for further treatment.

That which we claim as our invention, and desire to secure by Letters Patent, is—

1. The method of purifying water which consists in employing a reagent substantially insoluble in the water to be treated adapted to react with the impurity to be affected to produce an insoluble compound, and effecting a chemical reaction between such reagent and the impurity to be affected, substantially as described.

2. The method of purifying water which consists in employing a reagent substantially insoluble in the water to be treated adapted to react with the impurity to be affected to produce an insoluble compound, and effecting by electrolysis a chemical reaction between such reagent and the impurity to be affected, substantially as described.

3. The method of purifying water which consists in introducing thereinto a reagent substantially insoluble in the water to be treated adapted to react with the impurity to be affected to produce an insoluble compound, effecting a chemical reaction between such reagent and the impurity to be affected, and introducing a soluble reagent adapted to react upon elements liberated by the decomposition of such impurity, substantially as described.

4. The method of purifying water which consists in introducing thereinto a reagent substantially insoluble in the water to be treated adapted to react with the impurity to be affected to produce an insoluble compound, effecting by electrolysis a chemical reaction between such reagent and the impurity to be affected, and introducing a soluble reagent adapted to react upon elements liberated by the decomposition of such impurity, substantially as described.

5. The method of purifying water which consists in introducing thereinto, in powdered form, a substantially water-insoluble reagent adapted to react with the impurity to be affected to produce an insoluble compound, disseminating said reagent throughout the body of water to be treated, and electrolyzing the mixture, substantially as described.

6. The method of purifying water which consists in introducing thereinto a substantially water-insoluble salt of barium adapted to react with the impurity to be affected to produce an insoluble compound, and electrolyzing the mixture, substantially as described.

7. The method of purifying water which consists in introducing thereinto a barium carbonate, and electrolyzing the mixture, substantially as described.

8. The method of purifying water which consists in introducing thereinto an insoluble salt of barium and a soluble reagent adapted to unite with the product of the reaction between said barium salt and the impurity to be affected, and electrolyzing the mixture, substantially as described.

9. The method of purifying water which consists in introducing thereinto barium carbonate and a soluble reagent adapted to unite with the product of the reaction between said barium carbonate and the impurity to be affected, and electrolyzing the mixture, substantially as described.

WILLIAM M. JEWELL.
WILLFORD J. McGEE.

Witnesses:
HELEN M. COLLIN,
JOHN L. JACKSON